(12) United States Patent
Bracha et al.

(10) Patent No.: US 7,040,119 B2
(45) Date of Patent: May 9, 2006

(54) METHOD AND DEVICE FOR LIQUEFYING HYDROGEN

(75) Inventors: Michael Bracha, Munich (DE); Rolf Trill, Gruenwald (DE); Joachim Wolf, Gruenwald (DE)

(73) Assignee: Linde AG, Wiesbaden (DE)

( * ) Notice: Subject to any disclaimer, the term of this patent is extended or adjusted under 35 U.S.C. 154(b) by 140 days.

(21) Appl. No.: 10/467,668

(22) PCT Filed: Feb. 8, 2002

(86) PCT No.: PCT/EP02/01347

§ 371 (c)(1),
(2), (4) Date: Jan. 16, 2004

(87) PCT Pub. No.: WO02/065037

PCT Pub. Date: Aug. 22, 2002

(65) Prior Publication Data

US 2004/0112083 A1    Jun. 17, 2004

(30) Foreign Application Priority Data

Feb. 13, 2001  (DE) ................................ 101 06 483

(51) Int. Cl.
*F25J 1/00* (2006.01)
*F25B 19/02* (2006.01)
(52) U.S. Cl. ......................................... 62/607; 62/51.2
(58) Field of Classification Search .................. 62/607, 62/612
See application file for complete search history.

(56) References Cited

U.S. PATENT DOCUMENTS

| 2,289,555 | A |   | 7/1942 | Simons |
|---|---|---|---|---|
| 2,937,076 | A | * | 5/1960 | Class et al. .................. 423/649 |
| 2,943,917 | A | * | 7/1960 | Weitzel et al. ............... 423/649 |
| 2,983,585 | A | * | 5/1961 | Smith .......................... 423/653 |
| 3,098,732 | A | * | 7/1963 | Wolcott ........................ 62/637 |
| 3,375,076 | A | * | 3/1968 | Vander Arend ............. 423/649 |
| 3,380,809 | A | * | 4/1968 | Newton ....................... 423/649 |
| 3,389,555 | A | * | 6/1968 | Goldstein et al. ......... 60/39.465 |
| 4,273,743 | A | * | 6/1981 | Barber et al. ................ 422/148 |
| 4,765,813 | A |   | 8/1988 | Gaumer et al. |

FOREIGN PATENT DOCUMENTS

FR              2306414            10/1976

* cited by examiner

*Primary Examiner*—William C. Doerrler
(74) *Attorney, Agent, or Firm*—Crowell & Moring LLP

(57) ABSTRACT

Described is a process and a device for liquefying hydrogen, whereby the hydrogen to be liquefied is liquefied against one or more refrigerant (mixture) circuits and/or by means of expansion and is guided over at least one ortho-para conversion catalyst.

Figure 1:
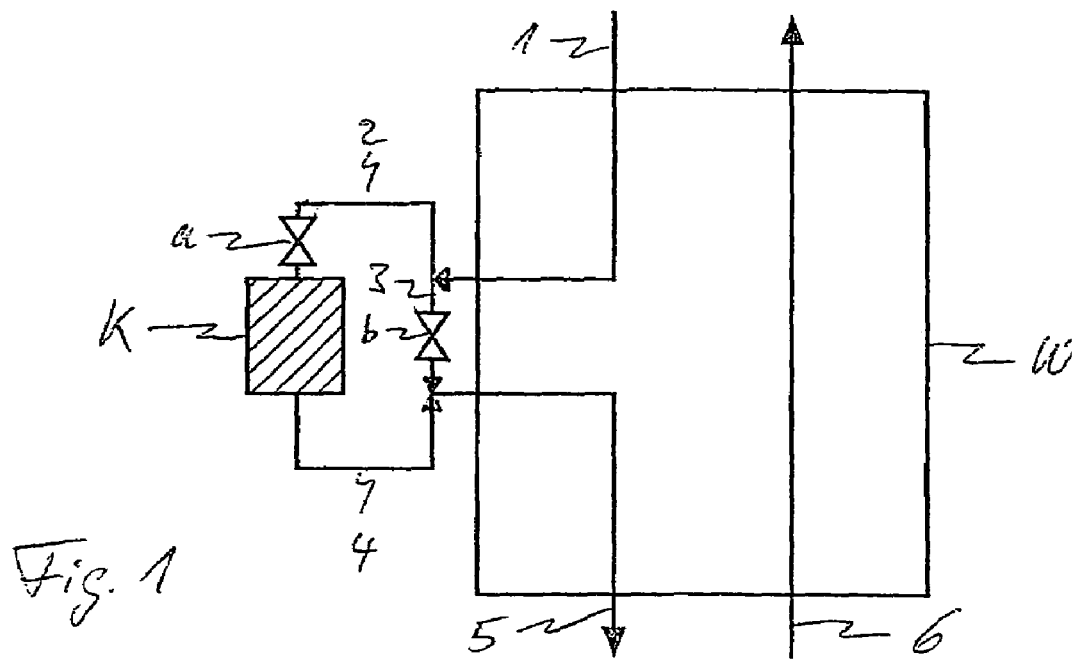

According to the invention, the ortho-para conversion catalyst or at least one of the ortho-para conversion catalysts (K) can be bypassed.

Furthermore, during the liquefaction process an exchange (7, 8) can take place between the hydrogen fraction (3), flowing (2, 4) through the ortho-para conversion catalyst(s) (K), and the hydrogen fraction (3), not flowing through the ortho-para conversion catalyst(s) (K).

12 Claims, 2 Drawing Sheets

METHOD AND DEVICE FOR LIQUEFYING HYDROGEN

The invention relates to a process for liquefying hydrogen, whereby the hydrogen to be liquefied is liquefied against one or more refrigerant (mixture) circuits and/or by means of expansion and is guided over at least one ortho-para conversion catalyst.

Furthermore, the invention relates to a device for liquefying hydrogen, comprising at least one heat exchanger, in which the hydrogen to be liquefied is cooled and liquefied against itself and/or one or more refrigerant (mixture) circuits and/or comprising at least one expansion unit, in which the hydrogen is expanded, and comprising at least one ortho-para conversion catalyst and/or one heat exchanger area, in which an ortho-para conversion catalyst is disposed.

Due to the hydrogen's unlimited availability as a constituent of water, its environmental acceptability following combustion, its storability and its transportability in the liquid state, hydrogen belongs to the energy sources of the future.

The hydrogen molecule consists of two hydrogen atoms, each of which in turn comprises one proton and one electron. It exists in two modifications, as ortho hydrogen or as para hydrogen, which are distinguishable by the spin of their nuclei. In the ortho modification the two nuclear spins are parallel; and in the para modification they are oriented anti-parallel. The two different orientations of the nuclear spins are responsible for the different magnetic, optical and thermal properties of the two modifications.

The equilibrium composition between the ortho and para modifications is a function of the temperature and changes from 25% para content at ambient temperature to 100% para content at 20 K. The conversion from ortho to para hydrogen is exothermic and by itself takes place slowly, i.e. over several days, but can be accelerated with the aid of catalysts. Since the heat of transition at boiling temperature is 669 J/g and is thus approximately 1.5 times as large as the heat of evaporation, it is unavoidable that as soon as the hydrogen liquefies during prolonged intermediate storage of the hydrogen, the normal hydrogen converts to para hydrogen, and the heat of transition that is released in the process is removed.

If hydrogen with a 25% para content were to be liquefied and then stored, the conversion from ortho hydrogen to para hydrogen would result in the evaporation again of half of the liquefied quantity of hydrogen within a few days due to the released transition heat.

Therefore, the customer of liquid hydrogen, who would like to store it perhaps for several weeks, will demand from the supplier a para content of at least 98% in the hydrogen-liquid product.

Therefore, the goal in liquefying hydrogen is to conduct the conversion of ortho hydrogen to the para form as continuously as possible in order to be able to remove the transition heat at correspondingly high temperatures. The alternative variant—conducting the conversion to para hydrogen first at very low temperatures—requires significantly more theoretical liquefaction work.

The VDI report no. 725 (1998), title: "Systems for Hydrogen Liquefaction and its Components", discloses a standard process for liquefying a hydrogen stream, which is liberated from impurities, like carbon dioxide, carbon monoxide, methane and water. The hydrogen is usually liquefied by a hydrogen—coolant circuit which generates the low temperature, required to cool and liquefy the hydrogen, by means of compression in compressors with subsequent expansion in turbines. In addition, in most cases liquid nitrogen is used for pre-cooling. Such a procedure can be inferred, for example, from FIG. 2 of the aforementioned VDI report.

Whereas the liquefaction process, described in the aforementioned VDI report, has several catalysts, in which the conversion from normal to para hydrogen takes place and these ortho-para conversion catalysts are connected downstream of the individual heat exchanger (stages), processes are also realized in which the corresponding catalyst material is filled directly into passages of the heat exchanger(s) that is/are provided for said catalyst material.

In a large number of applications of liquefied hydrogen, however, there is no need for long storage periods. Often the liquefied hydrogen is even consumed immediately after the liquefaction—as is the case, for example, with the use of liquid hydrogen for hydrogen-operated vehicles or aircrafts or vehicles, equipped with a fuel cell. For these applications it is not necessary that the hydrogen to be liquefied is totally converted to para hydrogen, because even in the case of an incomplete conversion the prescribed after-conversion either does not occur any more or has no negative effects.

Thus, with the liquefaction of hydrogen the driving power could be saved, because without any conversion the liquefaction of normal hydrogen to para hydrogen requires a theoretic liquefaction work of 12.019 KJ/kg, whereas with sliding conversion the liquefaction of normal hydrogen to para hydrogen requires a theoretic liquefaction work of 14.228 KJ/kg.

The object of the present invention is to provide a process as well as a device for liquefying hydrogen, which makes it possible to vary the degree of conversion of normal hydrogen to para hydrogen.

To solve this problem a generic process is proposed that is characterized in that the ortho-para conversion catalyst or at least one of the ortho-para conversion catalysts can be bypassed.

The generic device for liquefying hydrogen is characterized in that mediums for bypassing the ortho-para conversion catalyst(s) and/or the heat exchanger area(s), in which an ortho-para conversion catalyst is disposed, are proposed.

In contrast to the known procedures the para content of the hydrogen to be liquefied is now not automatically maximized, but rather optimized specifically with respect to the later use of the liquefied hydrogen. This is done, according to the invention, in that the anticipated ortho-para conversion catalysts can be bypassed. After these ortho-para conversion catalysts are arranged either separated from the heat exchangers or arranged in the heat exchangers themselves, corresponding lines and/or passages are provided in the heat exchangers, through which the hydrogen to be cooled and liquefied flows.

It is not always absolutely necessary that the ortho-para conversion catalyst(s) is/are totally bypassed. By means of suitable routine measures the hydrogen stream to be liquefied can be divided between an ortho-para conversion catalyst and the line and/or (heat exchanger) passage, bypassing said catalyst.

In addition to the advantage of a conversion adapted to the application of the liquefied hydrogen, the invention has, however, the drawback that the system engineering complexity increases with the provision of additional lines and/or corresponding passages in the heat exchangers.

To improve the inventive process for liquefying hydrogen, it is proposed that at least one liquid hydrogen fraction, exhibiting a para content that is different from the liquefied hydrogen (product), is fed to the liquefied hydrogen (product).

Thus, for example, a liquid hydrogen fraction, which was obtained by means of a liquefaction process, in which there is no traversing of an ortho-para conversion catalyst, can be combined with a liquid hydrogen fraction, exhibiting a very high para content; and thus the desired para content can be obtained or adjusted.

The inventive process for liquefying hydrogen, the inventive device for liquefying hydrogen, as well as other embodiments of the said process or device, which are the subject matter of the dependent patent claims, are explained in detail below with reference to the embodiments, depicted in FIGS. 1 to 4.

FIGS. 1 to 4 depict a heat exchanger W, to which one ortho-para conversion catalyst K (FIGS. 1 to 3) or two ortho-para conversion catalysts (FIG. 4) are assigned. In the case of the embodiment of FIG. 1, the ortho-para conversion catalyst K is arranged separated from the heat exchanger W, whereas in the embodiments of FIGS. 2 to 4 it is disposed in the heat exchanger itself.

According to the embodiment, depicted in FIG. 1, the hydrogen stream to be liquefied is fed over line 1 to the heat exchanger W and is cooled and liquefied in this heat exchanger against a suitable cooling medium, which is guided over line 6 through the heat exchanger. At this stage the entire or a partial flow of the hydrogen stream to be liquefied can be fed over line 2 to an ortho-para conversion catalyst K. Connected upstream of this catalyst K is a control valve a. From the ortho-para conversion catalyst K the hydrogen stream is then removed over line 4 and fed again to the heat exchanger W, from which the liquefied hydrogen stream is then removed over line 5.

If at this stage at least one partial flow of the hydrogen stream to be liquefied is not fed to the ortho-para catalyst K, it can be guided over the bypass line 3, in which a control valve b is also provided, past the ortho-para conversion catalyst K. Thus, by means of both control valves a and b any arbitrary distribution of the hydrogen stream to be liquefied between the catalyst K and/or the bypass line 3 can be set.

Figure 2:
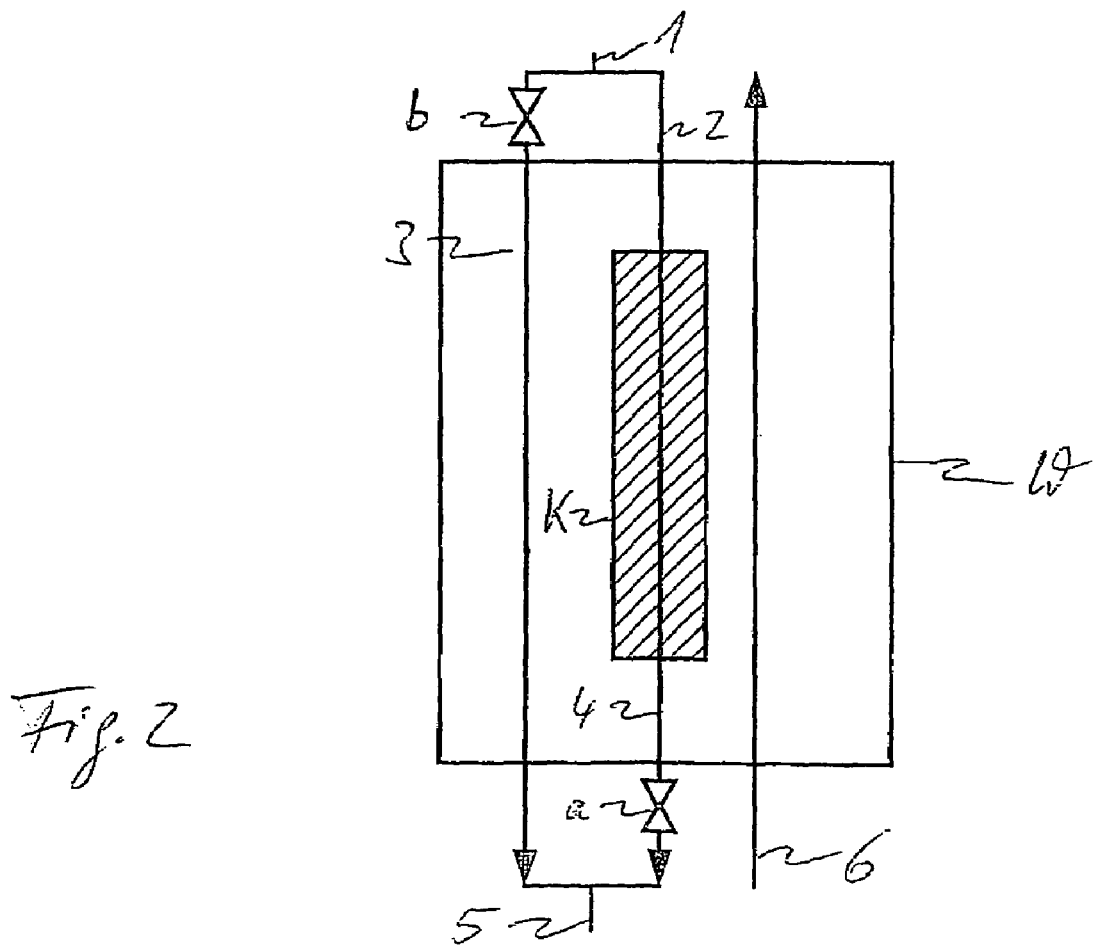

The distinction between the embodiment of the invention depicted in FIG. 2 and the embodiment depicted in FIG. 1 lies only in the fact that the ortho-para conversion catalyst K is arranged in the heat exchanger W itself. Otherwise, the procedure as well as the interconnection of the lines and valves are identical to those of FIG. 1.

Figure 3:
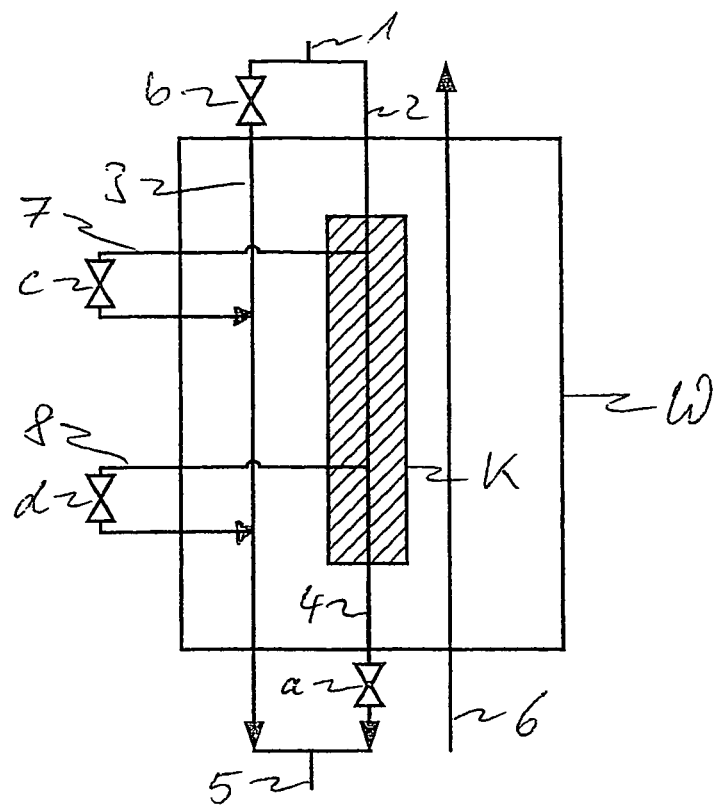

FIG. 3 depicts another design of the embodiment shown in FIG. 2, where now additionally two side outlets are provided (lines 7 and 8), over which partial flows of the hydrogen stream, fed to the ortho-para conversion catalyst K, are removed and can be admixed with the partial flow of the hydrogen stream to be liquefied and guided into the bypass line 3. Instead of the two side outlets, shown in FIG. 3, only one side outlet or also several side outlets can also be provided.

By means of the embodiment of the inventive process, an even greater variability with respect to the adjustment of the para content of the hydrogen stream to be liquefied can be obtained. However, this is achieved only at a higher system engineering cost.

Figure 4:
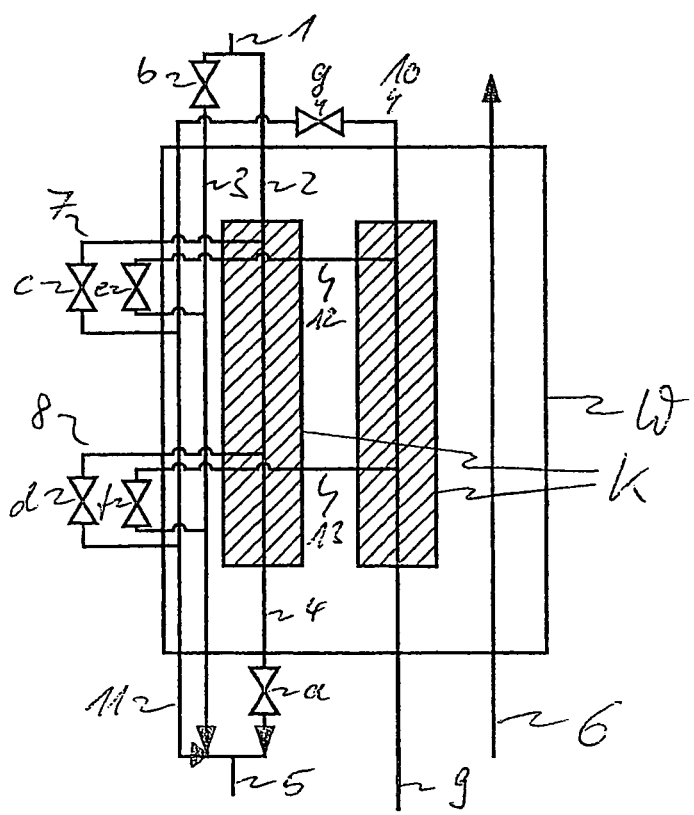

The embodiment, shown in FIG. 4, represents an expansion of the embodiment shown in FIG. 3. This embodiment the low temperature can be recovered in that, for example, a hydrogen stream is removed from a storage tank, in which hydrogen with a high para content is stored, and fed over line 9 to one of two ortho-para conversion catalysts K. In said catalyst now a para-ortho conversion of the hydrogen, fed over line 9, takes place and thus the low temperature is recovered, because the para-ortho conversion runs endothermically. Then the converted hydrogen stream is fed over line 10 to the relief valve g, in which it is expanded and after passage through the heat exchanger W over line 11 is admixed with the liquefied hydrogen stream in the line 5.

Furthermore, besides the two side outlets (lines 7 and 8), already explained with reference to FIG. 3, there are two other side outlets (lines 12 and 13) that increase with their control valves e and f the adjustment possibilities with respect to the para content of the hydrogen stream to be liquefied.

It also applies to the embodiment, depicted in FIG. 4, that the improvements in energy must be achieved at a correspondingly higher system engineering cost.

The invention claimed is:

1. A process for liquefying hydrogen, comprising:
   a) liquefying hydrogen against one or more refrigerant circuits or means of expansion to form liquefied hydrogen;
   b) guiding at least a portion of the liquefied hydrogen over at least one ortho-para conversion catalyst; and
   c) by-passing at least a portion of the liquefied hydrogen around at least one of the ortho-para conversion catalysts;
   wherein at least a portion of the liquefied hydrogen guided over the ortho-para conversion catalyst is mixed with at least a portion of the liquefied hydrogen that is by-passed around the ortho-para conversion catalyst.

2. The process as claimed in claim 1, wherein at least one liquid hydrogen fraction exhibits a para hydrogen content.

3. A process as claimed in claim 1, wherein the liquefied hydrogen guided over at least one ortho-para conversion catalyst is subjected to a para-ortho conversion.

4. A process as claimed in claim 3, wherein the liquefied hydrogen guided over at least one ortho-para conversion catalyst and subjected to a para-ortho conversion is mixed with at least a portion of the liquefied hydrogen that is by-passed around the ortho-para conversion catalyst.

5. A device for liquefying hydrogen, comprising
   a) at least one heat exchanger, in which the hydrogen to be liquefied is cooled and liquefied against itself or one or more refrigerant circuits;
   b) at least one expansion unit, in which the hydrogen is expanded;

c) at least one ortho-para conversion catalyst;
d) at least one heat exchanger area, in which an ortho-para conversion catalyst is disposed;
e) means to by-pass the ortho-para conversion catalyst or the heat exchanger area in which the ortho-para conversion catalyst is disposed; and
f) means to mix at least a portion of the liquefied hydrogen guided over the ortho-para conversion catalyst with at least a portion of the liquefied hydrogen that is by-passed around the ortho-para conversion catalyst.

6. A process for liquefying hydrogen, comprising:
a) passing hydrogen through a heat exchanger along with a cooling medium;
b) contacting at least a portion of the hydrogen being passed through the heat exchanger with a hydrogen conversion catalyst to convert the hydrogen from a first rotation state to second rotation state;
c) by-passing at least a portion of the hydrogen in the first rotation state around the hydrogen conversion catalyst to maintain at least a portion of the hydrogen in the first rotation state; and
d) combining at least a portion of the hydrogen converted to the second rotation state with at least a portion of the hydrogen by-passed around the hydrogen conversion catalyst to obtain a mix of hydrogen in the first and second rotation states.

7. The process of claim 6, wherein the hydrogen contacted with the hydrogen conversion catalyst is predominantly converted to the para state.

8. The process of claim 6, further comprising expanding at least a portion of the hydrogen converted from the first rotation state to the second rotation state.

9. The process of claim 8, wherein at least a portion of the expanded hydrogen is combined with hydrogen of opposition rotation state.

10. The process of claim 8, wherein the expanded hydrogen is predominantly in the ortho state.

11. The process of claim 6, wherein the first rotation state is a para rotation state and the second rotation state is an ortho rotation state.

12. The process of claim 6, wherein the first rotation state is an ortho rotation state and the second rotation state is a para rotation state.

* * * * *